July 18, 1944.   E. DICKEY   2,353,883
REFRIGERATING APPARATUS
Filed March 31, 1942   2 Sheets-Sheet 1

Ernest Dickey, INVENTOR.
BY Spencer, Hardman & Fehr,
Attorneys.

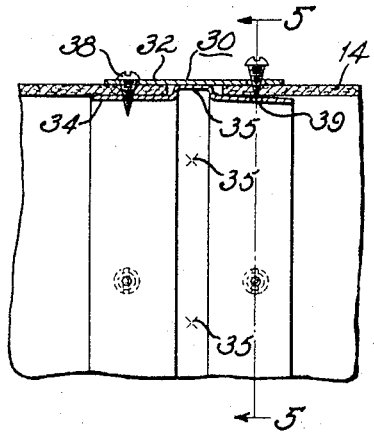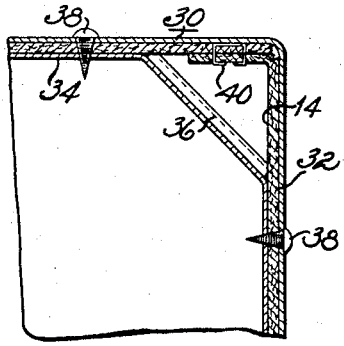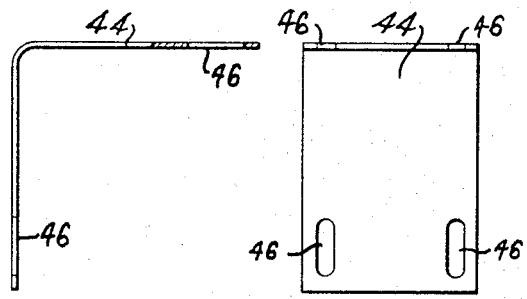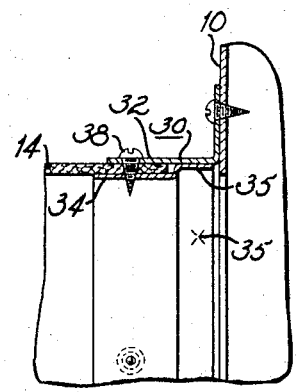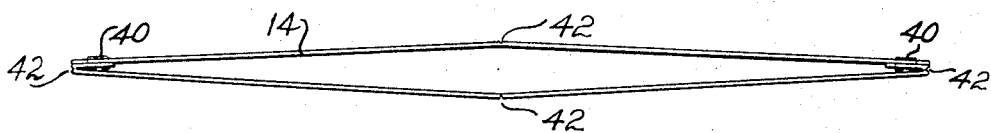

Patented July 18, 1944

2,353,883

UNITED STATES PATENT OFFICE 2,353,883

REFRIGERATING APPARATUS

Ernest Dickey, Dayton, Ohio, assignor to General Motors Corporation, Dayton, Ohio, a corporation of Delaware Application March 31, 1942, Serial No. 437,094

5 Claims. (Cl. 138—78)

This invention relates to refrigerating apparatus and more particularly to an improved duct construction.

One object of this invention is to provide lightweight, low cost, air distributing ducts.

Another object of this invention is to provide ducts which are easily assembled.

Another object of this invention is to eliminate the creaking noises usually produced by the expansion and contraction of metal ducts.

Still another object of this invention is to provide a special joint or bracket for connecting sections of duct. It is recognized that a large number of joints have been devised in the past but none of these have combined rigidity, simplicity and ease of assembly.

A further object of this invention is to provide a simple means for supporting long lengths of duct work.

Further objects and advantages of the present invention will be apparent from the following description, reference being had to the accompanying drawings, wherein a preferred form of the present invention is clearly shown.

In the drawings:

Fig. 4 is a fragmentary sectional view.

Fig. 5 is a view taken on line 5—5 of Fig. 4;

Fig. 6 shows one of the corner pieces;

Fig. 7 is another view of the corner piece shown in Fig. 6;

Fig. 8 is a fragmentary sectional view taken on line 8—8 of Fig. 1; and

Fig. 9 shows one section of a duct folded to facilitate transportation.

In the usual prior art type of air conditioning system, the cost of the duct work is a major item. Furthermore, the cost of installation of the duct work has been a large item due to the difficulty of installing the prior art ducts.

Figure 1:
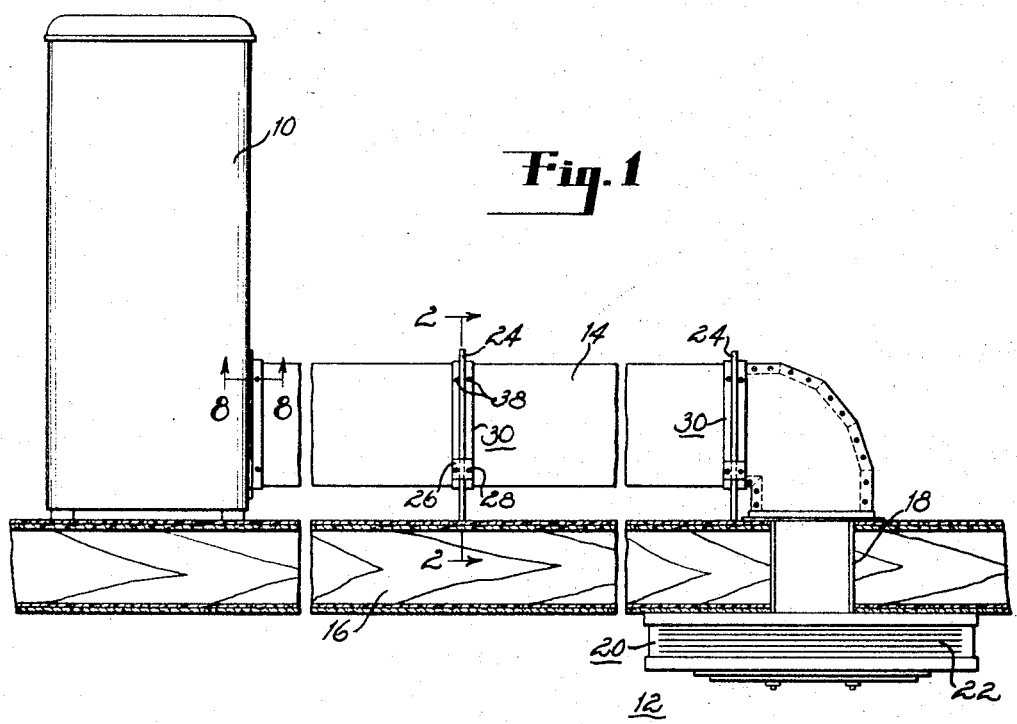
Fig. 1 is a vertical sectional view showing an air conditioning unit provided with a duct construction in accordance with my invention.

In Fig. 1 of the drawings, I have shown an air conditioning unit 10 preferably of the reverse cycle type capable of supplying either heated air or cooled air to the space 12 via the duct 14. It has been found very practical to mount the entire air conditioning apparatus in the attic or in some corresponding top floor room, but in so doing, it is important that the weight of the apparatus and the ducts be maintained at a minimum. In the arrangement shown in Fig. 1, reference numeral 16 designates the attic floor provided with an aperture 18 through which the conditioning air is discharged downwardly to the air distributing plaque 20. The plaque 20 is provided with air outlets 22 for distributing the air horizontally along the ceiling of the space to be conditioned. It frequently happens that the main air conditioning cabinet must be placed at a point remote from the air distributing plaque 20, and in such instances, it becomes necessary to provide ducts leading from the air conditioning unit to the plaque.

Reference numeral 24 designates posts used for supporting the weight of the duct intermediate the ends of a long duct. These posts may be eliminated completely for short duct sections. The number of posts provided will obviously depend upon the length of the duct used. The posts 24 are secured to the sides of the duct by means of brackets 26 held in place by screws 28. Each bracket 26 is secured to the duct at one of the joints whereby the screws 28 which hold the brackets in place also serve to hold the joint together.

Figures 2, 3:
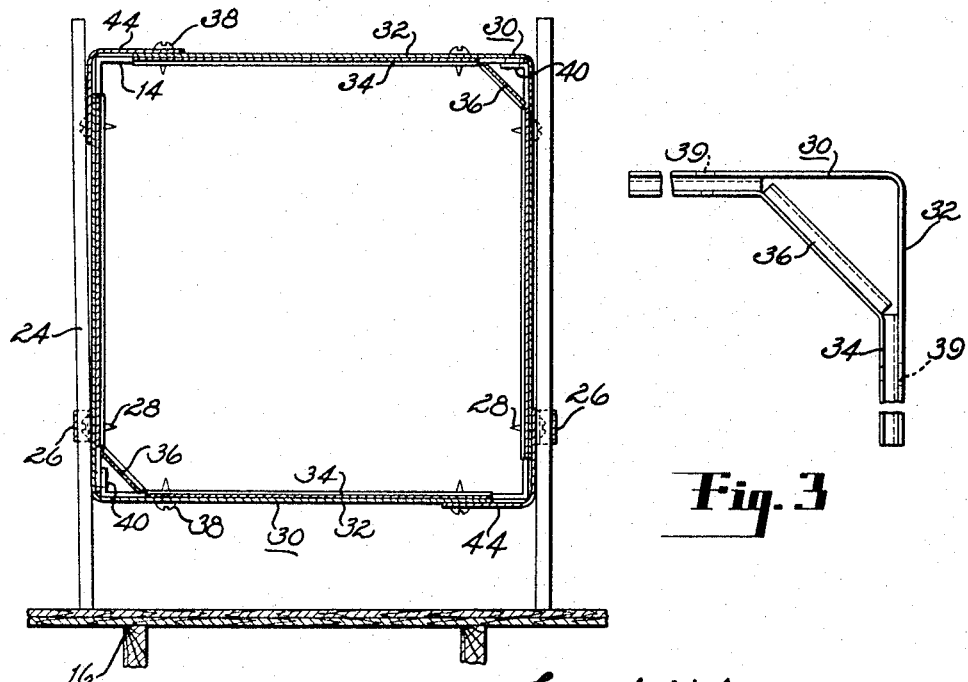
Fig. 2 is a vertical sectional view taken on line 2—2 of Fig. 1.
Fig. 3 is a fragmentary sectional view on an enlarged scale showing the construction of a joint for use in my improved duct construction.

Each joint comprises a pair of brackets 30 for holding the ends of the flexible duct in assembled relationship and a pair of corner straps 44. Each bracket 30 comprises an outer metal strap element 32 and an inner retaining member 34. (See Figs. 3, 4 and 5.) The elements 32 and 34 are spot welded together as indicated at 35 in Fig. 4. Referring now to Fig. 3, it will be observed that the inner member 34 is not bent at right angles at the corner but includes a portion 36 which serves as a reinforcing bracket adjacent the corner of the duct. The inner strap 34 is creased longitudinally, as shown, whereby it has greater rigidity than a flat strap would have. It will also be observed, in referring to Fig. 4, that the inner member 34 is wider than the outer strap 32 and that the main portion of the inner member 34 is disposed at an angle with respect to the outer strap 32 before the screws 38 are tightened so as to facilitate the introduction of the end of the duct into the space between the straps 32 and 34. After the duct, which is preferably made from fireproof and moistureproof cardboard, is assembled, metal screws 38 are used for drawing the flange portion of the inner strap 34 into clamping engagement with the end of the duct. Holes 39 are provided in the straps 32 and 34 through which the screws 38 project. The holes in the strap 34 are made small enough to engage the threads on the screws 38. Thus, as the screws 38 are tightened, the flange portion of the strap 34 is pulled parallel to the strap 32. By virtue of this arrangement, the straps 32 and 34 serve as a vise for holding the cardboard duct in place. In Fig. 4, the screw 38 at the left has been tightened but the screw 38 at the right has not been tightened.

The duct is preferably made from two sections of material and stapled together by means of staples 40. Creases 42 are provided in the cardboard so as to facilitate bending of the cardboard. The creases 42 are placed adjacent the stapled joints so that the stapled joints are located adjacent the opposite corners of the duct where the brackets 36 provide enough clearance for the double thickness joint. By virtue of the extra clearance provided between the inner strap 34 and the outer strap 32 at each corner, the joint does not interfere with the assembly of the end of the duct within the space provided between the straps. Corner members 44 are provided for reinforcing two of the corners of the duct, as best shown in Figs. 2, 6 and 7. Slots 46 are provided in the members 44 for the reception of the screws 38.

By virtue of the above described arrangement, the duct work is easy to assemble and is of lightweight, durable construction.

In Fig. 8, I have shown an adapter for securing the end of the duct to the air conditioning unit.

While the form of embodiment of the invention as herein disclosed constitutes a preferred form, it is to be understood that other forms might be adopted, all coming within the scope of the claims which follow.

What is claimed is as follows:

1. Duct means comprising a plurality of non-metallic conduit sections held together by a sheet metal connecting device, said sheet metal connecting device comprising a first strap member in engagement with the outer surface of the conduit sections, a second strap member secured to said first strap member and arranged in engagement with the inner surface of the conduit sections, one of said strap members comprising an integral reinforcing corner brace extending across an inner corner of said conduit.

2. A duct joint for joining the ends of two duct sections comprising in combination, a pair of parallel sheet metal straps fastened together along the center line and flared apart along the edges for the reception of the duct ends between the flared portions, one of said straps being wider than the other and serving to guide the end of each duct into the space between the flared portions, and means for drawing the flared portions closer together so as to tightly grip the ends of the ducts.

3. A duct joint for joining the ends of two duct sections comprising in combination, an outer strap having a right angle bend intermediate the ends thereof, an inner strap secured to and arranged parallel to the outer strap throughout portions of its length and arranged at an angle to said ends through another portion of its length so as to form a corner brace.

4. Duct means comprising in combination, a plurality of conduit sections and sheet metal connecting means for connecting sections of conduit together, said conduit sections including a lap joint adjacent one corner of said conduit, said sheet metal connecting means comprising a pair of sheet metal straps one of which is creased longitudinally so as to add rigidity, said straps being spaced from one another along the edges thereof so as to receive the ends of the conduit therebetween, the inner strap being spaced from the outer strap adjacent the corner of said conduit so as to provide clearance for said lap joint and so as to form a corner brace.

5. Duct means comprising a plurality of conduit sections held together by a connecting device, said connecting device comprising a first strap member in engagement with the outer surface of the conduit sections, a second strap member secured to said first strap member and arranged in engagement with the inner surface of the conduit sections, one of said strap members comprising an integral reinforcing corner brace extending across an inner corner of said conduit.

ERNEST DICKEY.